United States Patent [19]
Lantz

[11] 4,348,195
[45] Sep. 7, 1982

[54] MULTIPLE STEP VENTED HULL

[76] Inventor: George H. Lantz, 7520 Rovena, Anchorage, Ak. 99502

[21] Appl. No.: 37,818

[22] Filed: May 10, 1979

[51] Int. Cl.³ .............................................. B63H 1/38
[52] U.S. Cl. ..................................... 440/100; 114/291
[58] Field of Search ............... 115/20, 1 R; 114/67 A, 114/288, 289, 291, 56; 440/98, 99, 100

[56] References Cited

U.S. PATENT DOCUMENTS

| | | | |
|---|---|---|---|
| 1,024,682 | 4/1912 | Fauber | 114/291 |
| 1,050,517 | 1/1913 | Chase | 114/291 |
| 1,296,155 | 4/1919 | Bazaine | 114/291 |
| 1,880,371 | 10/1932 | Brush | 114/291 |
| 1,933,598 | 11/1933 | Parker | 114/289 |
| 2,396,721 | 3/1946 | Patterson et al. | 114/291 |
| 2,423,860 | 7/1947 | Van Patten | 114/291 |
| 3,148,652 | 9/1964 | Canazzi | 114/56 |
| 3,628,493 | 12/1971 | Headrick | 115/1 R |
| 3,874,315 | 4/1975 | Wright | 114/67 A |

FOREIGN PATENT DOCUMENTS 110326  4/1944  Sweden ........................ 114/67 A Primary Examiner—Trygve M. Blix
Assistant Examiner—Jesus D. Sotelo
Attorney, Agent, or Firm—Poms, Smith, Lande & Rose

[57] ABSTRACT

A boat hull is provided with a series of steps which are angled toward the center of the hull from the front to the rear of the hull. In order to permit easy riding up of the hull on the steps progressively, as the speed of the hull is increased, the steps are carried over the side of the hull above the normal water line of the hull when the boat is stationary. As the power is increased, the wetted area of the hull is progressively decreased and the friction of the hull and its resistance to forward motion is progressively decreased as the hull rides further out of the water. The principles as described above are applicable to airplane hulls, the wheels of amphibious vehicles, and other variations of normal type boat hulls.

2 Claims, 27 Drawing Figures

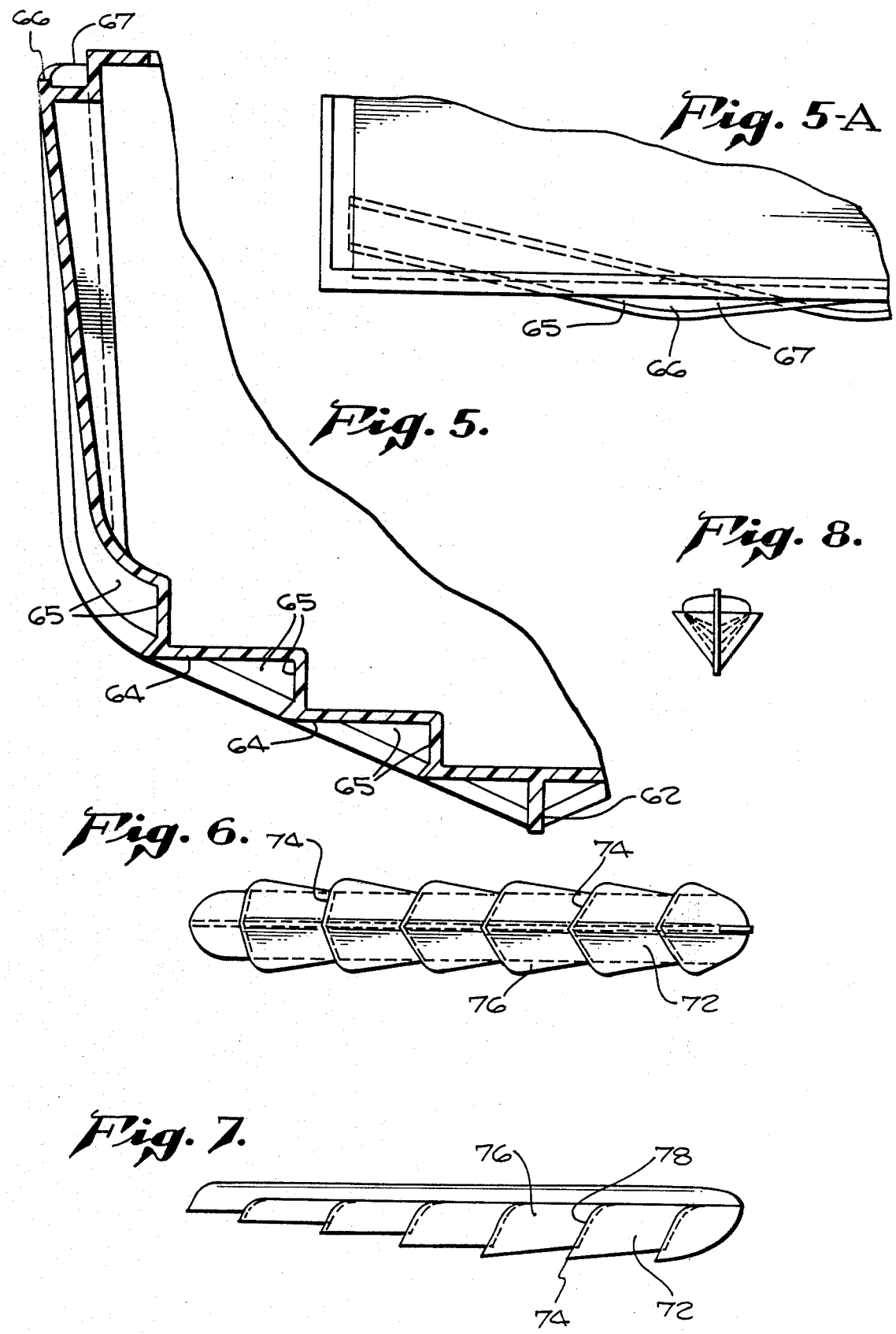

MULTIPLE STEP VENTED HULL

FIELD OF THE INVENTION

This invention relates to improved stepped hulls.

BACKGROUND OF THE INVENTION

It has been previously proposed to use steps in hulls to reduce the area of engagement between the hull of a boat and the water, thereby increasing the speed of the boat. Such hulls have been used on racing boats, on plane floats, and on amphibious plane hulls. However, these steps are not directly exposed to the atmosphere, and require a certain minimum speed, a very powerful engine and expenditure of substantial amounts of energy to get the hull up "on the step" sufficiently high to allow air under the hull to break the vacuum, or water-to-hull contact in the area immediately behind the vertical portion of the step. This phenomenon is apparent from the observed fact that it takes a float plane a much greater distance to take off from the water when the water is calm than when it is choppy. If the water is choppy, the step is exposed to the atmosphere in the valley between the waves, thus breaking the vacuum or the contact between the float and the water much sooner, thereby increasing the speed as the wetted area of the float decreases, and enabling a much shorter takeoff distance. The friction of a hull in water is a function of the wetted area of the hull, and the function of the step is to reduce the wetted area. Unfortunately, in most of the hull designs which have been proposed up to the present time, the boat hull is not easily brought up onto the step and this limits the usefulness of the stepped hull concept.

Prior stepped hull configurations of one type or another are disclosed in U.S. Pat. Nos. 1,050,517; 1,296,155; and 3,874,315.

SUMMARY OF THE INVENTION

In accordance with the present invention, a boat hull, or other surface intended for high speed engagement with the water includes a series of steps on the surface of the hull, with these steps being angled toward the center of the hull from the front to the rear of the hull, and the steps are carried laterally above the water line of the hull or other structure in order to vent the rear surface of the step and readily permit progressive reduction in the wetted area of the hull.

In accordance with additional features of the invention, the structure as described above may be employed in amphibious vehicles, in which case the tires would be formed in the indicated manner; in amphibious airplanes in which the hull or the floats of the airplanes may be formed in the stepped configuration described above, and in other modifications.

The bottom of the hull or similar structure may be provided with a central keel, or may be stepped, in accordance with the desired design. Similarly, at the side of the hull or other structure, the steps are preferably carried forward toward the bow or the front of the hull or other structure so that the wetted area on the side of the hull is also reduced.

Also, the extensions of the step risers may be curved forward above the waterline so that their surface is generally parallel to the water surface to enhance venting behind the steps and to reduce turbulence.

In order to reduce friction, the trailing edge of the horizontally extending portion of each step may be deflected upward by a small angle so that it is tangent to the final high speed orientation of the vessel when it is "up on the step". In addition, if desired, the space may immediately behind each step may be curved to reduce turbulence and friction.

In addition, the orientation of each step surface, when viewed in vertical cross-section transverse to the hull, may be substantially horizontal so that, at the interface between the hull and the water, particularly at high speeds, the force tends to push the boat out of the water, rather than pushing the water aside.

The principles of the invention are also applicable to multiple hull vessels; and in such cases, the inner stepped surfaces may be provided with additional venting arrangements.

Advantages of the multiple step vented hull include the following:

1. This type of hull will require less fuel for comparable speeds, or will travel faster with comparable fuel consumption.

2. The multiple step vented hull requires less time and fuel to accelerate to cruising speed and rides relatively flat without squatting or ploughing through the water as in the case of conventional hulls.

3. The new design will produce less wake than conventional hulls and therefore will be safer among small boats and will cause less disturbance to marine life.

4. The new hull will draw less water than conventional hulls when in high speed forward motion.

5. The new hull may be built over most conventional hulls, and this would have the additional advantages of both reducing fuel consumption and making the boat safer by providing a double bottom.

6. When employed on airplane floats, or on amphibious plane hulls, the new design will permit shorter takeoff distances, thereby making smaller bodies of water accessible by aircraft; and of course fuel consumption during takeoff would also be reduced.

Other objects, features, and advantages of the present invention will become apparent from a consideration of the following detailed description and from the accompanying drawings.

BRIEF DESCRIPTION OF THE DRAWINGS

FIGS. 3, 4, and 5 are side, bottom and hull crosssectional views, respectively, of another alternative embodiment of the invention, and FIG. 5-A is a fragmentary top view of this embodiment;

FIGS. 6, 7 and 8 are bottom, side, and front end views, respectively, of an airplane float embodiment of the present invention;

DETAILED DESCRIPTION

Figure 1:
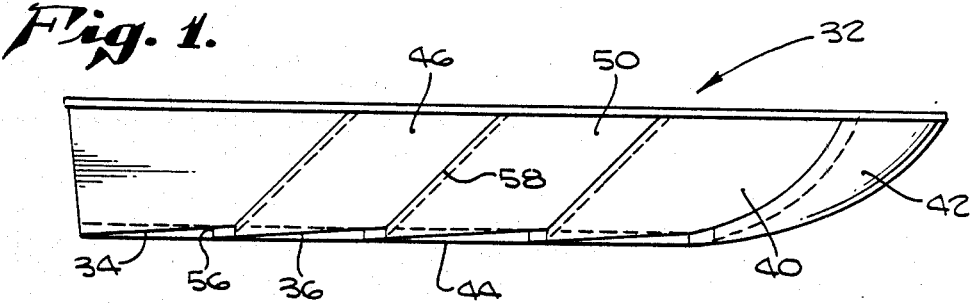
FIGS. 1 and 2 are a side view and a bottom view, respectively, of a boat hull illustrating the principles of the present invention.
Figure 2:
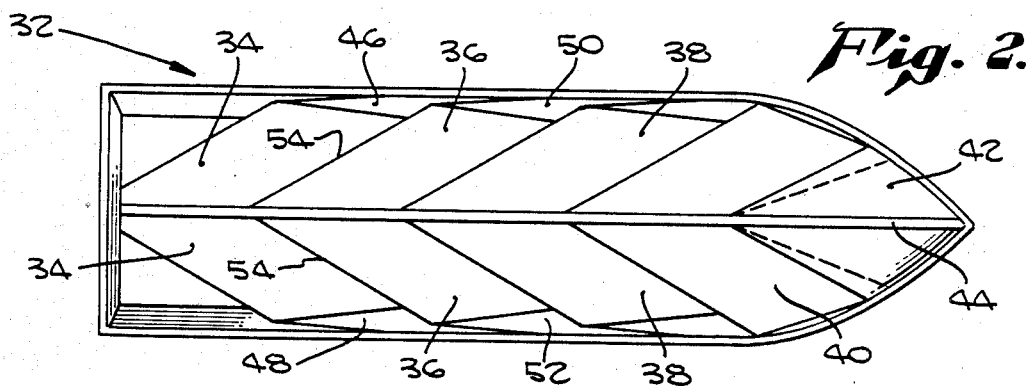

Referring more particularly to the drawings, the hull 32 of FIGS. 1 and 2 is provided with a series of stepped surfaces 34, 36, 38, 40 and 42. If desired, a central keel member 44 may be employed to give additional strength and rigidity to the hull. The keel member 44 may be flush with the lower rear edges of the steps, or if desired, may extend to a slightly greater depth than these steps.

The surfaces of the step 34 on both sides of the bottom of the hull directly engage the side surfaces 46 and 48 on the both sides of the hull 32; and in a similar manner, the two portions of the step 36 on either side of the keel member 44 are directly connected to the side surfaces 50 and 52 on the two sides of the hull.

The trailing edge 54 of the step 36 is spaced above the adjacent portion of the step 34 by a considerable distance, for example, about 2 inches, and this may be seen in FIG. 1 at point 56 where the rear edge of the step 36 engages the central keel member 44. This step extends forward toward the outside of the hull 32 and also extends upwardly at the interface 58 between the side panels 46 and 50, for example. Similarly, between each of the steps on the lower surface of the hull 32, there is a similar discontinuity between the rear edge of each of the steps and the front edge of the next successive step. Accordingly, each of the steps 34, 36, 38 and 40 makes a significant angle relative to the lower edge of the keel member 44. Also, in each case, the step configuration is carried over to the sides of the hull to a point at least above the normal waterline of the hull, when it is in the stationary or rest position.

Accordingly, the front zone of each of the steps is directly connected or "vented" to the atmosphere to easily permit progressive rising up of the hull as higher speeds are achieved, so that the wetted area and the frictional resistance to forward movement of the boat are progressively reduced.

In the embodiment shown in FIGS. 1 and 2, the steps and the side surfaces of the hull were essentially planar. In the arrangements shown in FIGS. 3, 4 and 5, however, a hydrodynamic surface is shown in which the steps are smoothly merged from the bottom of the hull to the side, rather than being subject to abrupt angular changes. More specifically, in FIGS. 3, 4 and 5, the hull inclues a central keel member 62 and a series of steps 64 which essentially cover the outer surface of the hull. As in the case of the embodiment of FIGS. 1 and 2, it may be noted that the rear edges of each of the steps is spaced above the front portion of each of the next succeeding step surface. Normally, there is a space of 2 or 3 inches for a vessel of the type indicated in FIGS. 3 through 5. As indicated in the figures, the steps extend up over the side surfaces of the hull well above the normal water line for the vessel when it is moored, so that venting will permit progressive rising of the vessel on its steps and progressive reduction in the wetted area of the hull, as the speed of the craft is increased.

Figure 3:
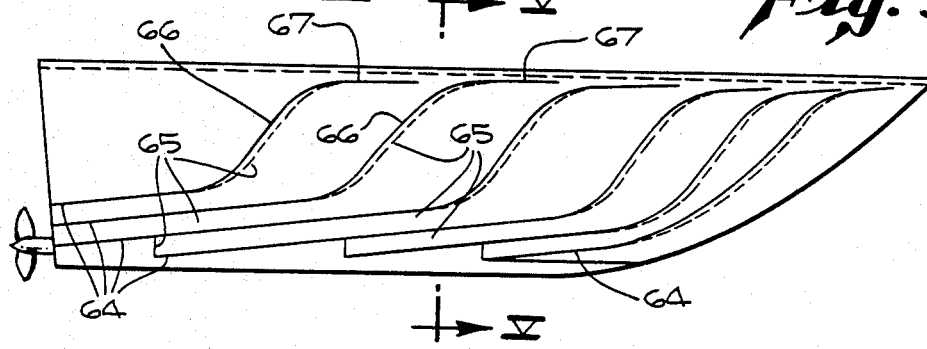
Figure 4:
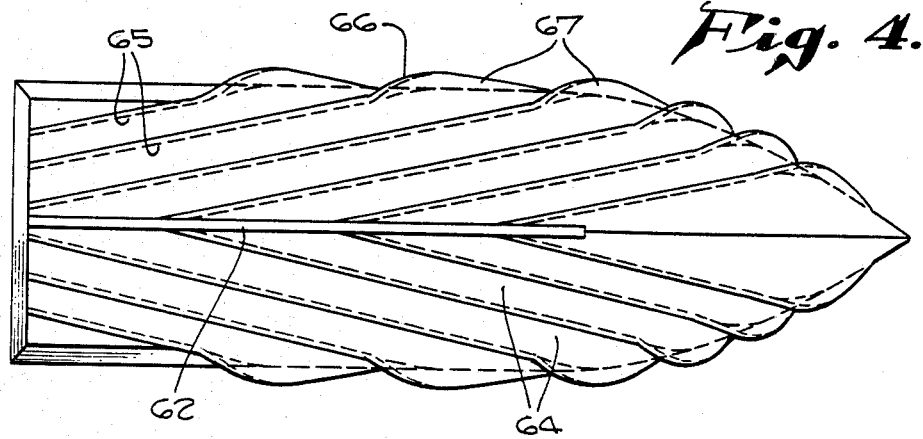

Incidentally, in the showing of FIGS. 3 through 5 and 5-A, at the upper termination of the steps 64 above the waterline, the rearward surface 65 of the step risers is curved forward at 66 to a surface 67 which is substantially parallel with the water surface. As the air passes over this surface, due to the forward motion of the boat, the air will follow the curved surface and fill the partial vacuum that is created directly behind the step riser. Without this feature the partial vacuum above and below the water level would tend to increase air and water turbulance and exert a rearward force that would increase the drag along the boat surface.

FIGS. 6, 7 and 8 show a bottom view, a side view, and a front end view, respectively, of an airplane float. The principles illustrated in FIGS. 6 through 8 are similar to the principles involved in the earlier disclosed hull structures; however, the hull structure for an airplane float is longer and narrower than that employed for hull structures for more conventional boats. As indicated, for example, in FIG. 7, the step 72 at its rear edge 74 is spaced above the next step 76 by a significant vertical distance, so that as the aircraft increases in speed, venting will occur along the rear edge 78 of the step surface 72 so that the front portion of the step 76 is no longer wetted, thereby reducing drag.

Figure 9:
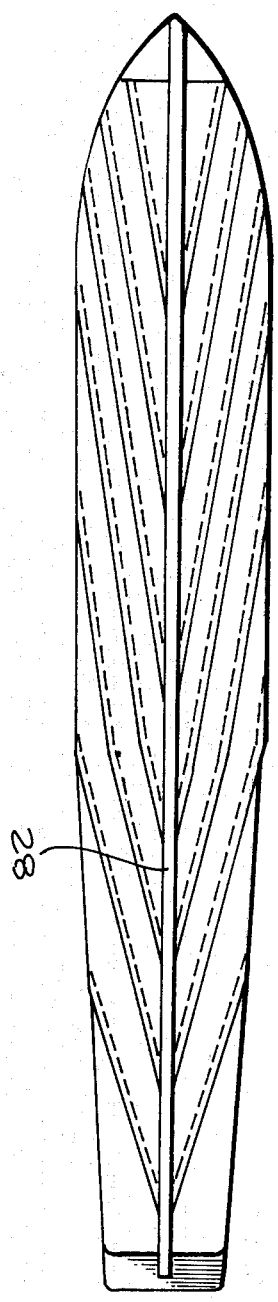
FIGS. 9 and 10 show another airplane float construction, with FIG. 9 being a bottom view and FIG. 10 being a side view.
Figure 10:
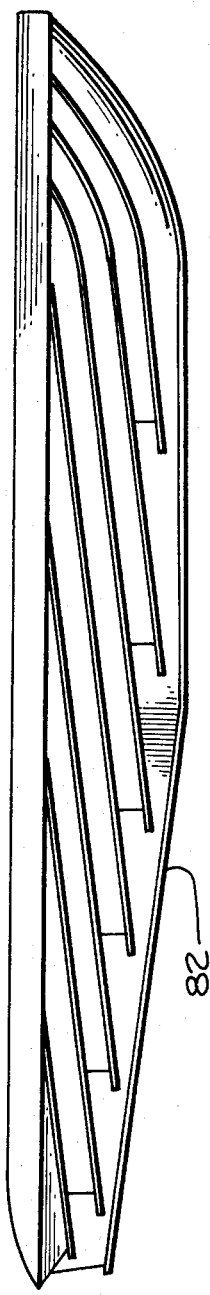

FIGS. 9 and 10 represent another similar airplane float. In the embodiment of FIGS. 9 and 10, however, a central keel or runner member 82 is provided, and the steps are configured to terminate at, or immediate adjacent, this central keel member 82. If desired, the keel member 82 may serve the collateral function of including a heavily strengthened metal runner surface along its length, so that it may be employed by the pilot to land on ice or frozen snow, if necessary.

Figure 11:
FIG. 11 is a side view of yet another airplane float embodiment of the invention in which the central member of the hull is stepped.

FIG. 11 shows an alternative embodiment of the invention in which the central keel member is provided with steps, in addition to the stepped configuration of the remainder of the airplane float. Apart from this feature, the hull configuration of FIG. 11 corresponds substantially with that of other embodiments described hereinabove, in that the rear edges of the various stepped surfaces are spaced above the front portions of the next subsequent step surfaces, and the steps all extend above the normal water line of the float when it is in the rest condition.

Figure 12:
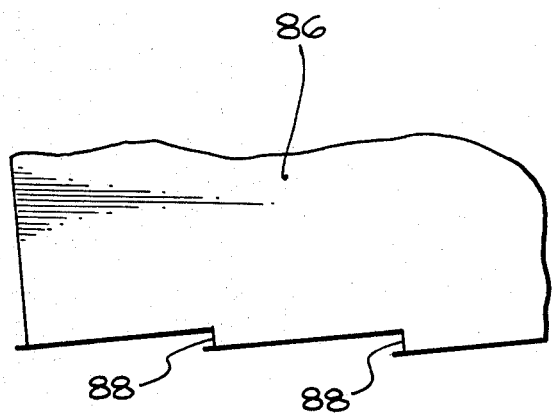
FIGS. 12, 13 and 14 are details of the step configuration showing various alternative arrangements.
Figure 13:
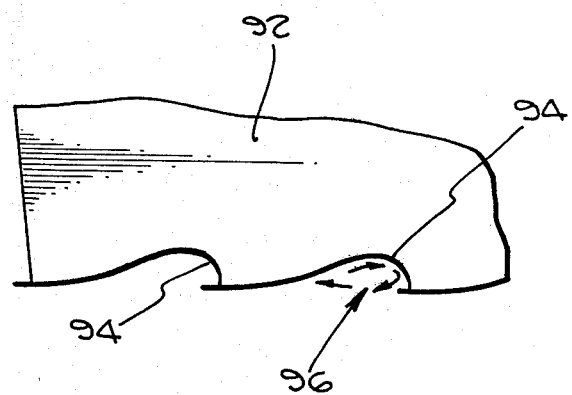
Figure 14:
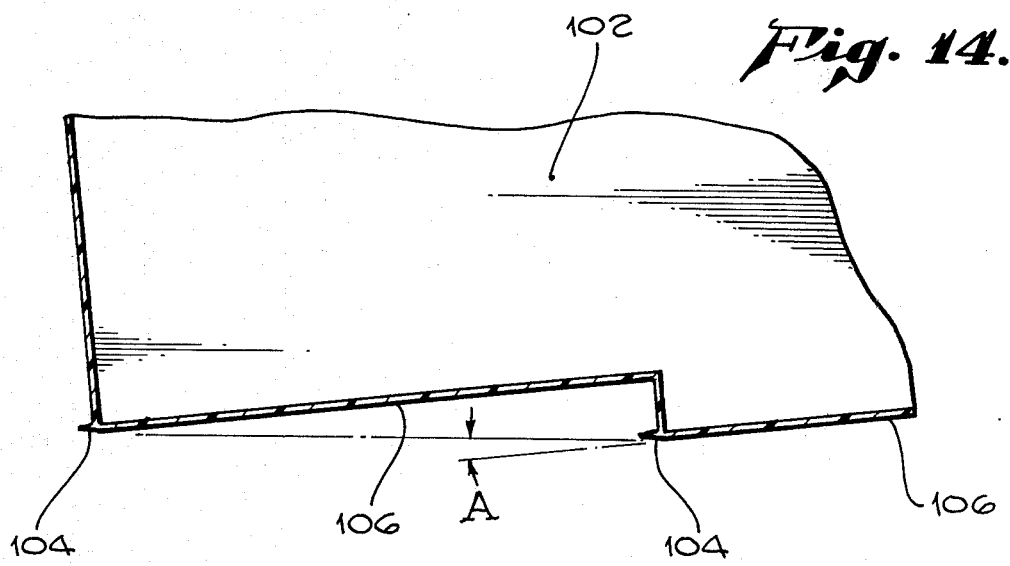

FIGS. 12, 13 and 14 show variations of the step configurations which may be employed in accordance with the present invention. In FIG. 12, the hull 86 is provided with simple square steps 88. In FIG. 13 the hull 92 is provided with rounded step configurations 94 immediately to the rear of the edge of each preceding step. When this configuration is employed, a vortex, as indicated by the arrows 96, would be formed and this would reduce drag at certain high speeds in an action which would be similar to that of a roller between the water surface and the bottom of the boat.

In the arrangement shown in FIG. 14, the hull 102 is provided with steps having a very short section 104 at the rear of each step section 106, with the sections 104 being tangent to the water surface, and therefore, slightly angled from the plane of the remainder of the step surfaces 106. This is indicated by the angle "A" shown in FIG. 14. For very fast boats, this configuration prevents the trailing edge of the steps from plowing deeper into the water.

Figure 15:
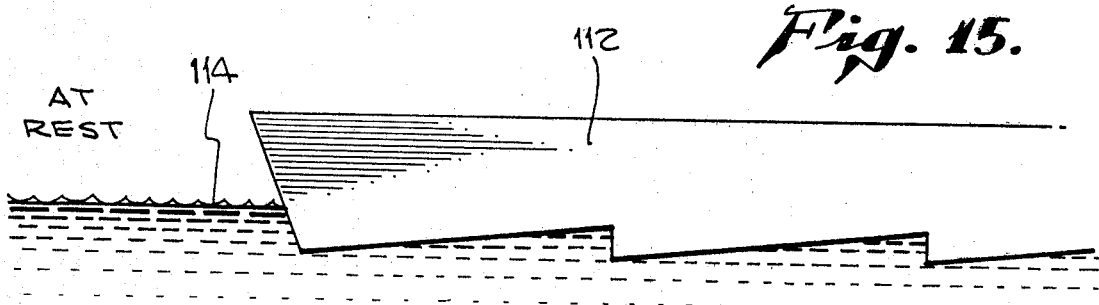
FIGS. 15 through 18 of the drawings show schematically the progressively reduced hull-to-water contact, as speed is increased.
Figure 16:
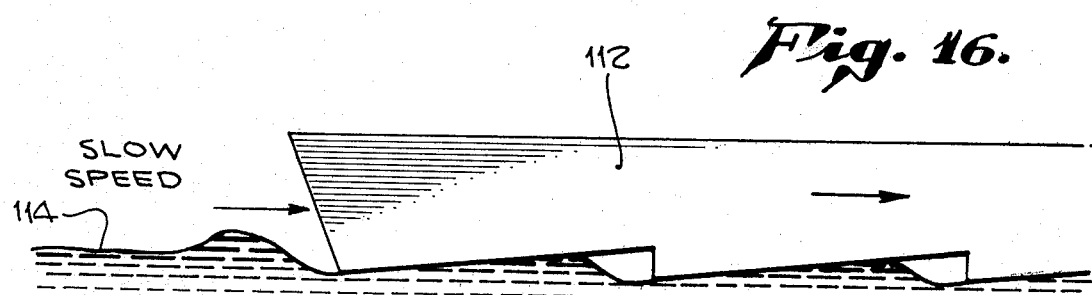
Figure 17:
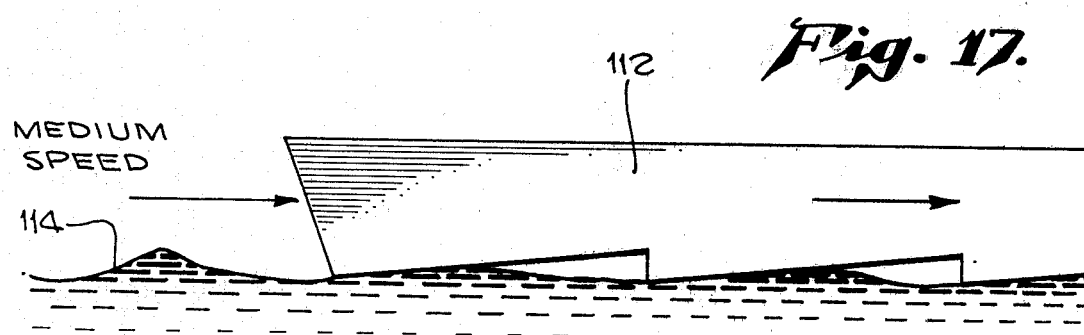
Figure 18:
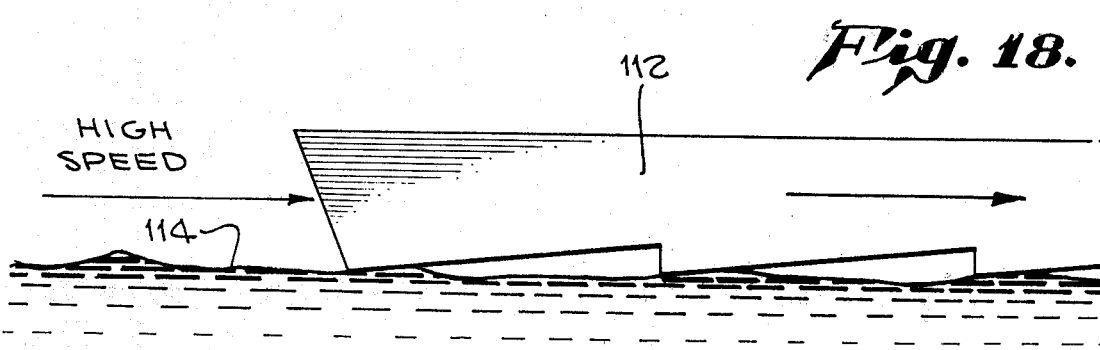
Figure 19:
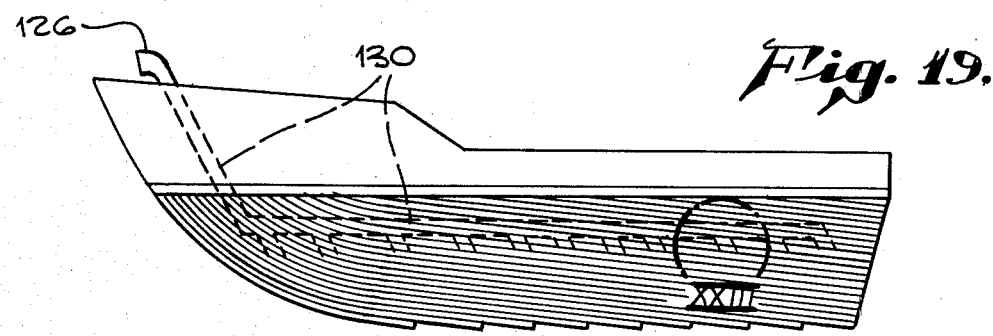
FIGS. 19 through 23 are a series of views of a multiple hull embodiment of the invention.
Figure 20:
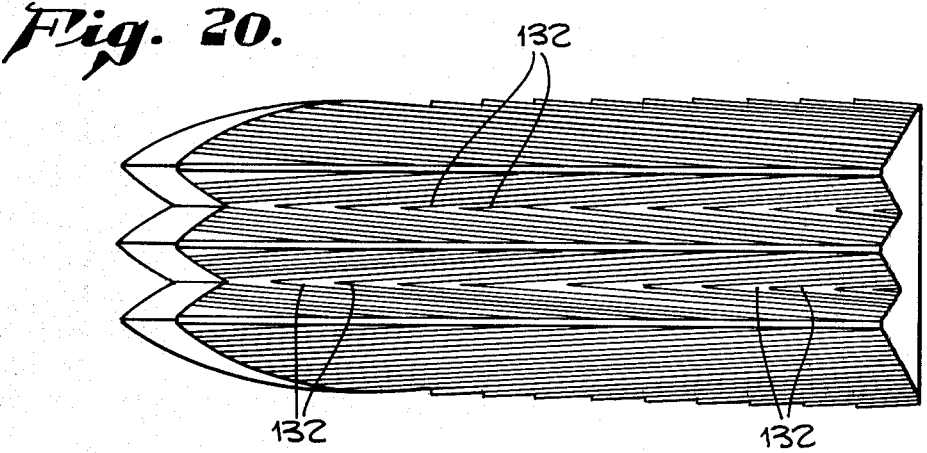

FIGS. 15 through 18 show a hull 112 floating in water 114. FIG. 15 shows the hull 112 at rest, and the successive figures show increasing forward movement of the hull 112 toward the right, with corresponding reduction in the wetted area of the hull which is in engagement with the water 114.

Figure 21:
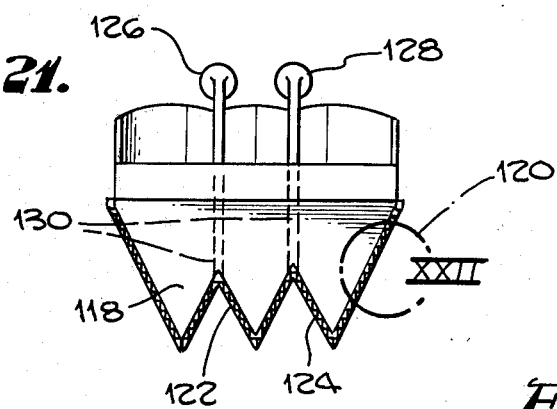
Figure 22:
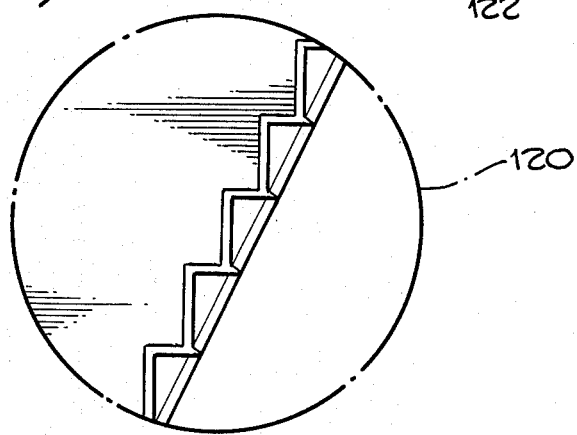
Figure 23:
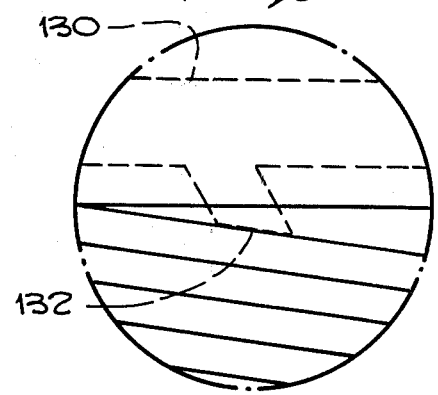

FIGS. 19 through 23 show various views of a larger boat intended for high endurance and high performance. As shown in FIG. 21, which is a rear view of the hull of FIG. 19, a very steep "deep-V" hull configuration 118 may be utilized. FIG. 22 is an enlarged view of the portion of FIG. 21 shown by the circle 120. In the rest condition, the central V's 122 and 124 are fully submerged. Accordingly, in order to provide venting to the steps on these inner surfaces, two vent tubes 126 and 128 are provided, and air which is drawn in through these vents, is supplied through the ducts 130 to openings 132 at the top of the V-configurations 122 and 124. The stability and other characteristics of the hull of FIGS. 19 through 23 are such as to make it an excellent patrol boat, rescue boat, or oil platform service boat.

Figure 24:
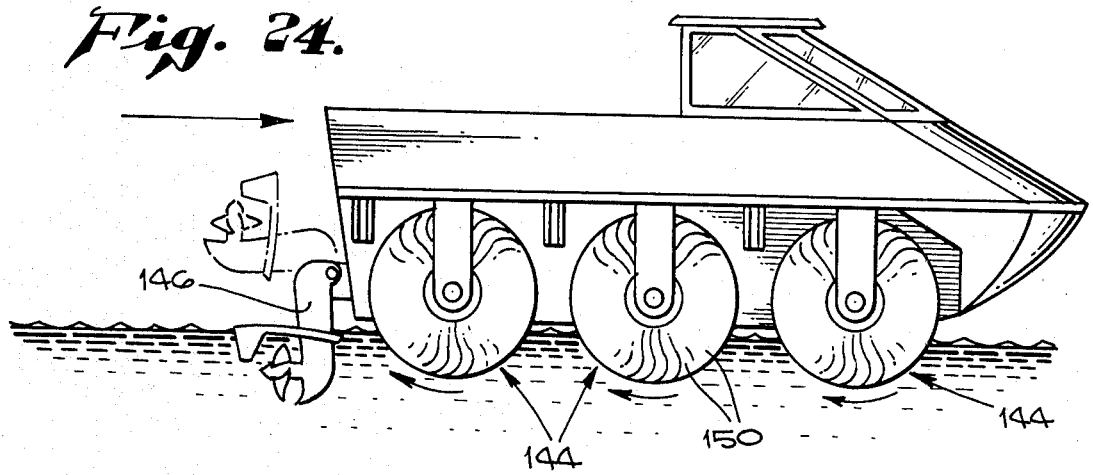
FIGS. 24, 25 and 26 show an amphibious vehicle in which the supporting flotation wheels are configured in accordance with the broad principles of the present invention.
Figure 25:
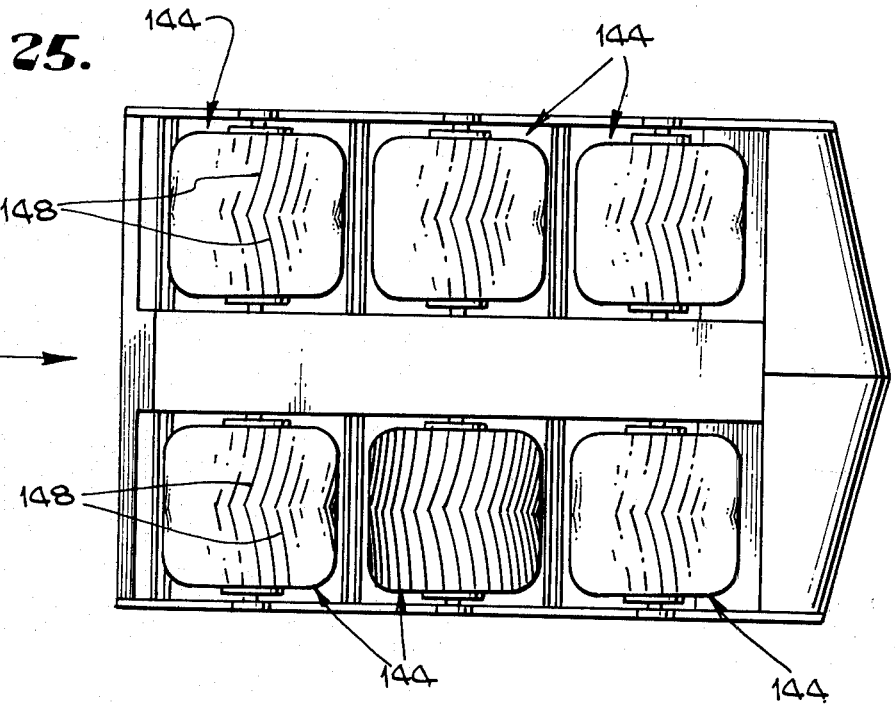
Figure 26:
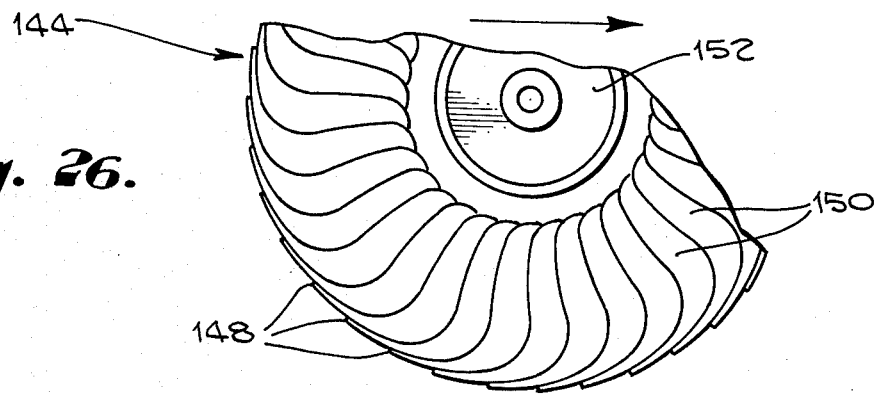

FIGS. 24, 25 and 26 illustrate the application of the principles of the invention to an all-terrain vehicle with the added capability of operating on water at much greater speeds than is possible with conventional ATV machines. With reference to FIGS. 24 and 25, the vehicle 142 is provided with a set of six large wheels 144. These large low pressure tires 144 are of suitable diameter and width so that they would provide 100% flotation with only approximately 25 to 35% of their diameter submerged, when the vehicle is floating at rest. In swamps or on land the machine would operate in the manner of conventional six-wheel, all-terrain vehicles. However, in water, outdrive as shown at 146 in FIG. 24, would be lowered into the water and power would be supplied from the engine to both the wheels and the out-drive. The speed of the wheels would be regulated through a transmission so that the outer circumference of the tires would turn at a rate slightly less than the speed of the craft. As the speed increases, the craft would rise higher and higher in the water, and since the wheels would be turning nearly as fast as the speed of the water, very little friction or drag of the surface of the tire on the water would result. The outer surface of the tire as indicated in FIGS. 25 and 26 would incorporate the steps as disclosed relative to the other embodiments of the invention, and would deflect and prevent the water from following the curvature of the tire up its back side, thus reducing the negative buoyancy. In FIG. 26, the steps 148 are clearly shown, and the side wall 150 operate in a manner similar to the side panels on the hulls described hereinabove, when the wheel is moving from left to right in FIG. 26, as indicated by arrow 152. It is contemplated that the tires could be in the order of 6 feet in diameter and could include approximately 36 segments. It is considered that the craft would make an excellent military assault vehicle for beach landings or river patrol. For such purposes, the tires would be filled with foam rubber or foam plastic to preclude deflation of the tires.

In the introduction of the present specification, several patents were mentioned. The stepped hydroplane boat of U.S. Pat. No. 1,050,517 is of interest, and apparently is intended to operate at high speeds with the wetting of only a few regions adjacent the steps. However, it lacks a number of the features of the present invention, including the convergent steps extending to the rear, and the venting arrangements including the steps extending above the normal water line of the craft. Accordingly, the feature of progressive reduction in the wetted area of the craft would not be readily achieved. The patent to L. Bazane No. 1,296,155 appears to have some similar principles, including the use of a series of steps, but does not have the convergent step configuration disclosed herein, nor the continuation of the steps beyond the water line so as to achieve easy venting. The more recent U.S. Pat. No. 3,874,315 to E. M. Wright, is of interest in the inclusion of a series of step panels, and venting arrangements therefor, but appears to require venting through apertures in order for it to operate successfully. The present convergent step configuration with venting by direct access to the hull structure on its sides above the water line is more convenient and simpler for obtaining progressive hydroplaning action.

Incidentally, with regard to the number of steps, the spacing between steps, and the vertical distance between the trailing edge of each step and the leading edge of the next successive step, these factors may vary depending on the size and shape of the flotation body and hull, and the intended velocity or range of speeds through the water. In the case of the boat shown in FIGS. 3, 4 and 5, it has an overall length of approximately 30 feet, and includes 7 spaced steps from front to rear. The trailing edge of each step is lower than the leading edge of the next successive step by about four or six inches, and the surface of each step may extend over the "riser" or vertical web interconnecting successive steps by as much as 2 or 3 inches, down to a flush assembly, with no overhang. In general, it is preferred that the surfaces of the steps in contact with the water are sloped upward toward the bow of the boat, and that, when viewed in vertical cross-section transverse to the hull, they appear substantially horizontal. This has the effect of raising the boat higher in the water as the speed increases, which in turn decreases the wetted area at the sides of the hull, thereby further reducing the drag. Much of the force supplied to the boat has the effect of pushing the boat higher out of the water, and much less energy is wasted in pushing the water aside as is the case in existing "Deep-V" type hulls.

Incidentally, regarding the vertical spacing between steps, or the height of the step risers, these can range from about one inch in the case of the tires on the vehicle of FIGS. 24–26, to about four or six inches in cabin cruisers, up to two feet or more in large ocean going vessels.

It may also be noted that a wide range of angles for the steps is possible. To reduce turbulence and maintain a streamlined configuration, the trailing edges of the steps as shown in FIG. 4 make an angle in the order of 30 degrees or less with the keel member at the center of the hull or the center line of the hull. However, this may be increased to 45 degrees or even higher, in the order of 60 degrees in the case of the tires employed in the all-terrain vehicle shown in FIGS. 24, 25 and 26. More generally, with a relatively deep-V overall hull configuration, the angle made by the edges of the steps with the centerline of the vessel will be smaller and with a shallower draft configuration, the angle will increase. Similarly with variations in the forward incline of the steps, the angle between the edge of the steps and the keel or the centerline of the ship will vary.

In conclusion, it is to be understood that the foregoing description and drawings are merely illustrative of the principles of the invention. Various minor design changes, such as the application to larger or smaller vessels, and minor departures in physical configuration are within the scope of the present invention.

What is claimed is:

1. An all-terrain vehicle for high speed travel on water, comprising:
   a plurality of broad flotation wheels, each of which is a flotation body;

a plurality of steps on the surface of each said flotation body, said steps being angled toward the center of said body from the front to the rear thereof; and each said step being sloped downward and to the rear;

means for venting the rear surface of each said step to the atmosphere, said means including lateral extension of each step to one of the sides of said body to a point above the normal water line when said flotation body is stationary, said extensions angling forward along the sides of said body and terminating in a curving arc extending forward substantially parallel to the surface of the water when said steps are in the water and said structure is moving forward; and means for driving said body through the water with sufficient speed to progressively raise said body up onto the steps so that there is progressively reduced contact between said flotation body and the water as the speed is increased.

2. A multiple step vented structure for high speed travel on water comprising:

a flotation body;

a plurality of steps on the surface of said body, said steps being angled toward the center of said body from the front to the rear thereof; and each said step being sloped downward to the rear;

means for venting the rear surface of each said step to the atmosphere, said means including lateral extension of each step to one of the sides of said body to a point above the normal water line when said flotation body is stationary, said extensions angling forward along the sides of said body and terminating in a curving arc extending forward substantially parallel to the surface of the water when said steps are in the water and said structure is moving forward;

means for driving said body through the water with sufficient speed to progressively raise said body up onto the steps so that there is progressively reduced contact between said flotation body and the water as the speed is increased; and said flotation body having an overall substantially circular configuration, and wherein said structure includes central opening means for receiving the hub of a wheel.

* * * * *